United States Patent [19]

Bochan

[11] 4,231,237
[45] Nov. 4, 1980

[54] WASHING MACHINE WITH DELAYED ACTION DRIVE CLUTCH

[75] Inventor: John Bochan, Louisville, Ky.

[73] Assignee: General Electric Company, Louisville, Ky.

[21] Appl. No.: 972,117

[22] Filed: Dec. 21, 1978

[51] Int. Cl.³ .................. D06F 23/04; D06F 37/40
[52] U.S. Cl. .................. 68/23.7; 192/48.3; 192/48.92; 192/105 CD; 192/109 D
[58] Field of Search .................. 68/23.6, 23.7; 192/48.3, 48.92, 105 A, 105 CD, 105 F, 109 D

[56] References Cited

U.S. PATENT DOCUMENTS

| | | | |
|---|---|---|---|
| 1,618,644 | 2/1927 | Dickson | 192/105 A |
| 2,555,772 | 6/1951 | Wickwire | 192/105 A |
| 2,869,344 | 1/1959 | Bochan | 68/12 R |
| 2,955,448 | 10/1960 | Olthuis | 68/12 R |
| 3,017,005 | 1/1962 | Muhlbeyer | 192/109 D X |
| 3,153,924 | 10/1964 | Alger | 68/12 R |
| 3,263,780 | 8/1966 | Melior | 192/105 CD X |
| 3,812,944 | 5/1974 | Patel | 192/109 D X |
| 3,850,276 | 11/1974 | Patel | 192/109 D X |
| 3,978,956 | 9/1976 | Bochan | 192/105 A |
| 4,038,841 | 8/1977 | Bright | 68/12 R |

FOREIGN PATENT DOCUMENTS 552134  6/1932  Fed. Rep. of Germany ... 192/105 CD

*Primary Examiner*—Philip R. Coe
*Attorney, Agent, or Firm*—Radford M. Reams

[57] ABSTRACT

A clothes washing machine of the type having recirculation of water from a tub into a perforated basket within which the clothes are received with a mechanically delayed action clutch driving both the agitator during wash and rinse cycles, and the basket during spin cycles. The mechanical delay in the case of the wash or rinse cycles enables a recirculation pump to bring the water level in the basket to the operating level after the machine fill prior to initiation of agitator drive. In the case of the spin cycle, the water level is reduced by a drain pump during the delay interval prior to initiation of the basket spin. The mechanical delay is introduced by a retarding action on the centrifugal drive clutch whereby after start of rotation of the drive motor, the full engagement of the centrifugally actuated clutch is delayed by a rotary damping action consisting of a washer caused to rotate through a volume of silicone liquid enclosed in a container.

22 Claims, 5 Drawing Figures

WASHING MACHINE WITH DELAYED ACTION DRIVE CLUTCH

BACKGROUND DISCUSSION

Conventional modern clothes washing machines typically consist of a perforate inner clothes receiving receptacle or basket nested within an outer, wash water retaining tub. An agitator extends into the interior of the basket and is oscillated in order to execute the washing action during the wash and rinse cycles.

Since this washing action is carried out completely within the confines of the basket, the volume of water which is present between the outer tub and the basket does not contribute to the washing or rinsing of the clothes, and this volume of water may be significant in a given washing machine design.

It has heretofore been recognized that water savings could be achieved by causing the water to be circulated from the tub into the basket during the wash and rinse cycles, such that a lower level of water exists in the tub than in the basket.

Examples of such systems are disclosed in U.S. Pat. Nos. 2,869,344 (Bochan); 2,955,448 (Olthuis); and 3,153,924 (Alger). All of these patents are assigned to the assignee of the present application.

During the initial fill cycle, water is introduced both into the basket and the tub, either simultaneously or by flowing through the openings in the basket, such that an equal level tends to exist in both the tub and basket.

Accordingly, at the completion of the fill cycle, the water level in the basket is somewhat below that at which the machine will operate after the recirculation of the water by the recirculation pump achieves a steady state washing or rinsing level in the basket.

This situation tends to produce a difficulty in that most agitators are designed to operate at a given water level and will not operate properly at the initial low water level. That is, there will be high motor torque demands during the beginning of the agitation cycle. Even with start up at the proper washing water level, a significant cost factor in the electric drive motor is the added expense of starting winding in order to accommodate the start up demand torques.

There also can be some fabric damage due to the lowered water level.

A similar situation exists with respect to the spin extraction cycle, which is normally provided in such machines, in which the perforate basket is rotated at high speed in order to extract the wash and rinse water from the clothes.

It is highly desirable for various reasons that the extraction rotation of the basket be not initiated until the water in the tub and basket has been drained through the household plumbing. This need has previously been recognized in the prior art and various arrangements proposed to introduce a delay into the activation of the agitator or basket drive at the beginning of either the wash and rinse or spin cycles, which will enable the pump up of water into the basket in the case of the agitator wash and rinse cycles and the drain down in the case of the spin cycle.

In some of these various approaches, as described in the above-mentioned patents, a delay is introduced electronically in which the controls provide for an interval of pump up or drain down at the initiation of each cycle, prior to activation of the drive clutch. This approach, however, complicates the design and operation of the controls, as well as the clutch components themselves.

In many designs, a relatively simple trouble-free arrangement is provided by a common drive of the recirculation and drain pumps with the same electrical motor driving the pumps, as well as the agitator and/or basket during the machine cycles. While this eliminates the need for separate drive components and/or controls for these elements, the introduction of a delay interval is rendered substantially more complicated.

In U.S. Pat. No. 3,978,956 (Bochan), a mechanical delay is provided for the spin cycle. While the arrangement described in this patent produces a purely mechanical delay in the initiation cycle, it involves a shifting movement of a blocking element which introduces the possibility of a malfunction of the device, preventing actuation of the drive due to hanging up of the blocker part and also variations in the time at which the clutch drive is established to the basket.

Accordingly, it is an object of the present invention to provide a clothes washing machine in which there is introduced a purely mechanical delay to either or both the agitator and/or basket spin drives and which does not require additional controls or operating components associated with the clutch drive.

It is a further object of the present invention to provide a delayed action clutch for such application which operates in a highly reliable manner and which is relatively simple in construction.

SUMMARY OF THE INVENTION

These and other objects of the present invention, which will become apparent upon a reading of the following specification and claims, will be achieved by a washing machine agitator basket drive including a delayed action clutch interposed in the drive motor and the basket agitator transmission.

The delay action clutch includes a centrifugal actuated drum clutch in which spring biased pivoted clutch shoes are pivoted outwardly and into engagement with the drum by centrifugal force in order to establish drive of the motor to the machine transmission. This delay is introduced by a rotary pot, in which the outward movement of the clutch shoes is converted into rotary movement of a rotary damper plate by a pair of connecting links connected to the shoes and the rotary damper plate. The rotary motion is resisted by means of a viscous force established by a wave washer driven by the rotary plate through a volume of a viscous liquid such as a silicone fluid. A one-way clutch is interposed between the rotary damper plate and the wave washer which allows free releasing movement of the clutch shoes.

This establishes a predetermined delay in the establishment of drive to the agitator and the basket, such that a delay period is introduced prior to the initiation of both the wash/rinse cycles, as well as the spin cycle, to afford the advantages of the delay feature both in the water saver systems described above, and in the centrifugal extract type machines.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
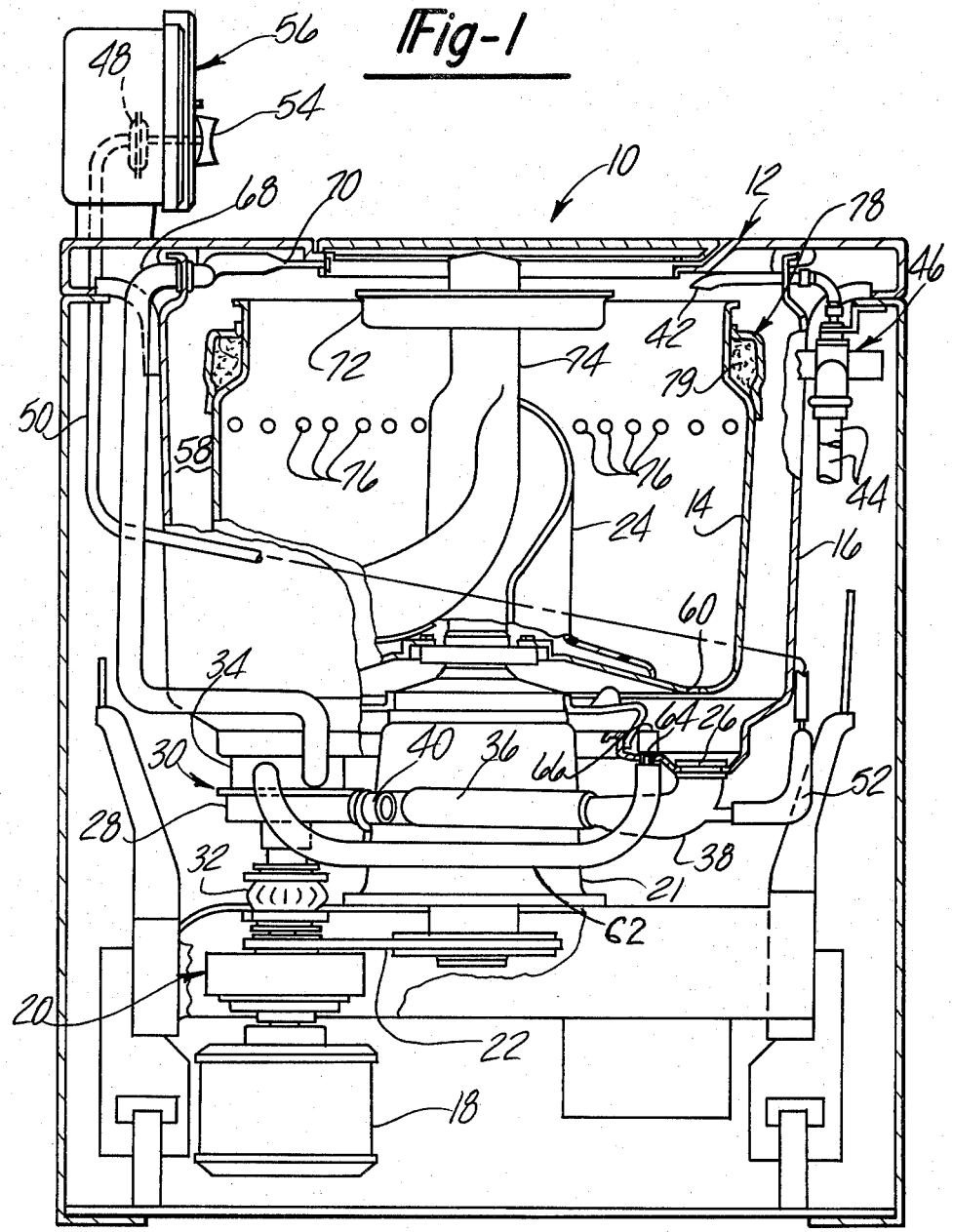
FIG. 1 is a side elevational view of a washing machine incorporating the delayed action clutch according to the present invention shown in partial section.

Referring to the drawings and particularly to FIG. 1, the clothes washing machine 10 includes an outer cabinet 12 within which are mounted the various functional components, including a generally cylindrical vertical axis clothes receiving perforate basket 14 and vertically disposed within the interior of the tub 16. The basket 14 is adapted to be spun by means including an electric drive motor 18 acting through a drive unit including a centrifugal clutch 20 and a belt drive 22, which also serves to drive a transmission 21 which oscillates an agitator 24 during wash and rinse cycles to provide a means for washing and rinsing the clothes and thereafter removing the wash and rinse water from the basket 14.

The clothes receiving basket 14 is adapted to contain the clothes during the wash and rinse cycles, and the water disposed therein extracted during a spinning of the basket 14 to cause the water to pass out into the tub 16 where it is collected.

Tub 16 is provided with a drain 26 which receives the basket overflow during the spin cycle, with the drain water pumped into the plumbing drain by means of a drain pump deck 28. The drain pump deck 28 is part of a stacked double pump assembly 30, driven via flexible coupling 32 by the drive motor 18, which drives the agitator 24 and the basket 14.

Double pump assembly 30 includes the drain pump deck 28 and also a recirculation pump deck 34. The drain pump deck has its impeller oriented such that during rotation of the drive motor 18 during spin of the basket 14, pumping action is created by the impeller, tending to pump water from an inlet connected to a hose 36, in turn secured to the drain fitting 38. The outlet 40 is directed to the external drain via a hose (not shown).

The particular clothes washing machine design depicted in FIG. 1 is intended to conserve water by reducing the level of water in the tub 16 during the wash and rinse cycles.

The basket 14 and tub 16 are initially filled at the start of each wash and rinse cycle via a fill spout 42 which receives water from supply lines 44 and a solenoid-operated fill valve 46. The fill valve 46 allows the flow of water under the control of pressure-sensitive switch 48, which senses the pressure head of the water in the tub 16 via a tube connection 50 with an air chamber 52 in fluid communication with the tub 14 via a connection with the drain fitting 38. The pressure-sensitive switch 48 is adjustable so as to be activated at a predetermined pressure level by a control knob 54 included on the machine control panel 56.

The arrangement operates in a well-known manner to adjust the particular pressure level at which the pressure-sensitive switch 48 is activated causing the solenoid-operated fill valve 46 to discontinue water flow when a predetermined level of water has been reached corresponding to the pressure head activating the pressure-sensitive switch 48.

In many clothes washing machine designs, the basket 14 is generally perforate such that the water level in the basket 14 tends to be the same as in the tub 16. In the design depicted in FIG. 1, a recirculation system is incorporated to reduce the level of water in the tub 16 after the tub and basket water fill, in order to reduce the volume of water required to carry out a wash or rinse cycle. This recirculation involves pumping of the water in the space 58 into the basket 14 during the wash and rinse cycles. The flow of water out of the basket 14 is controlled by providing a series of bottom-located perforations or openings 60 in the basket 14. Apportioning of inlet flow through fill spout 42 between the basket 14 and the tub 16 and flow through the openings 60 insures equal levels in the basket 14 and the tub 16 during fill, allowing accurate setting of the initial level, but the volume of water flow from the basket 14 into the tub 16 is controlled by the size and number of bottom-located openings 60.

Recirculation flow is produced by the recirculation pump deck 34 of the double pump assembly 30 with the inlet of the recirculation pump deck 34 connected via a hose 62 to a recirculation intake opening 64.

Recirculation pump deck 34 operates to create a pumping action by drive of the drive motor 18 whenever the oscillation of agitator 24 is taking place. In this drive condition, the drive motor 18 is rotating in the opposite direction from that in which it rotates during spin of the basket 14, such that a continuous pumping action takes place during the wash and rinse cycles in which the water is pumped out of the space 58 intermediate the basket 14 and tub 16.

The outlet of the recirculation pump deck 34 is connected to a recirculation hose 68 which directs the recirculated water into a nozzle 70 directing the recirculation flow into the interior of the basket 14, after having passed through a lint tray 72 mounted to the agitator post 74.

The capacity of the recirculation pump deck 34 is greater than the flow from the basket 14 into the tub 16 interior via the openings 60 such that the level of water in the tub 16 is ordinarily substantially below the level of water in the basket to thereby achieve the water saving end sought by this design.

In this type of system, in order to establish the maximum water level in the clothes basket, a series of overflow openings, such as those shown at 76 in FIG. 1, are normally provided at the level of the basket corresponding to the maximum water level. These overflow openings also act to allow extract water flow out of the basket during the spin cycle. Upon reaching this level, the flow through these openings creates a rate of escape of the water from the basket in excess of the capacity of the circulation pump, such that the water level cannot rise about the level.

In many washing machines, as here, the basket 14 is provided with a balancing ring 78. The balancing ring 78 has an annular pocket 79 filled with a heavy granular material such as magnetite which serves to eliminate the pertubations of the basket 14 occurring during spin.

Accordingly, in order to establish the level of water in the tub 16, a series of overflow perforations or openings 76 are formed at a height on the basket 14 corresponding to the set basket water level.

The water flow volume through the openings 76, taken together with the flow from the bottom-located openings 60, exceeds the capacity of the recirculation pump deck 34 which therefore cannot pump a sufficient volume of water out of the space 58 to equal this combined flow. The water level in the basket 14 is thereby stablized at this level which thereby establishes the maximum water level in the basket 14.

Figure 3:
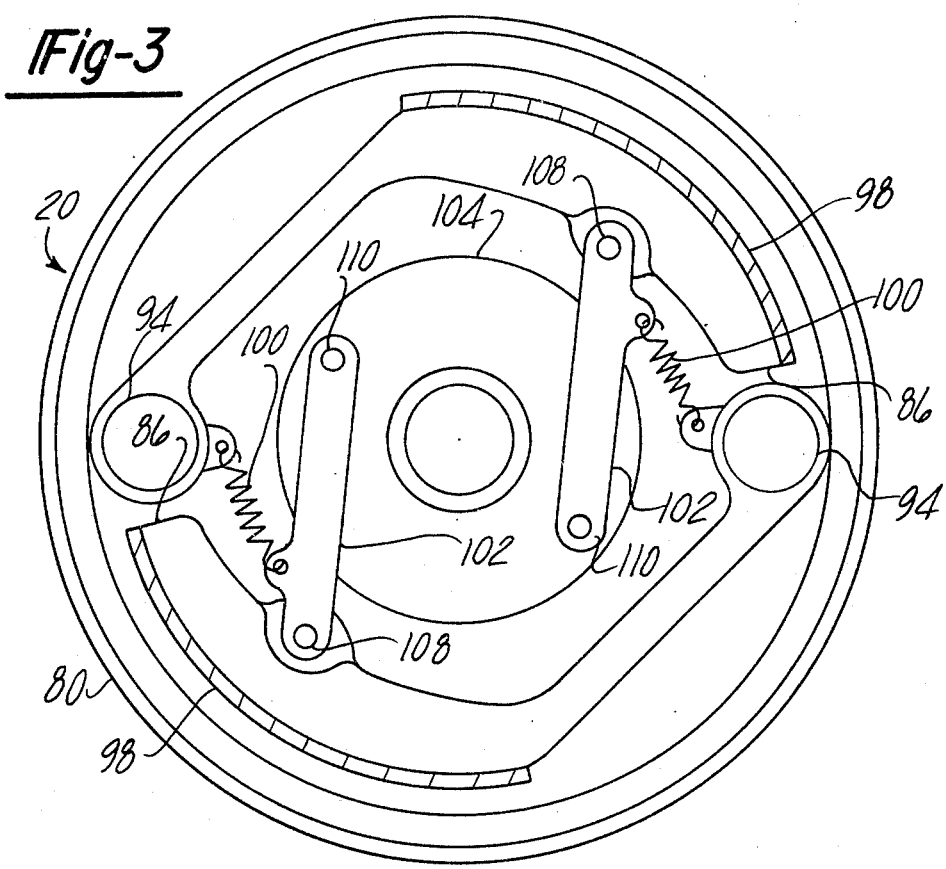
FIG. 3 is a plan view of the clutch shown in FIG. 2 shown in partial section.
Figure 2:
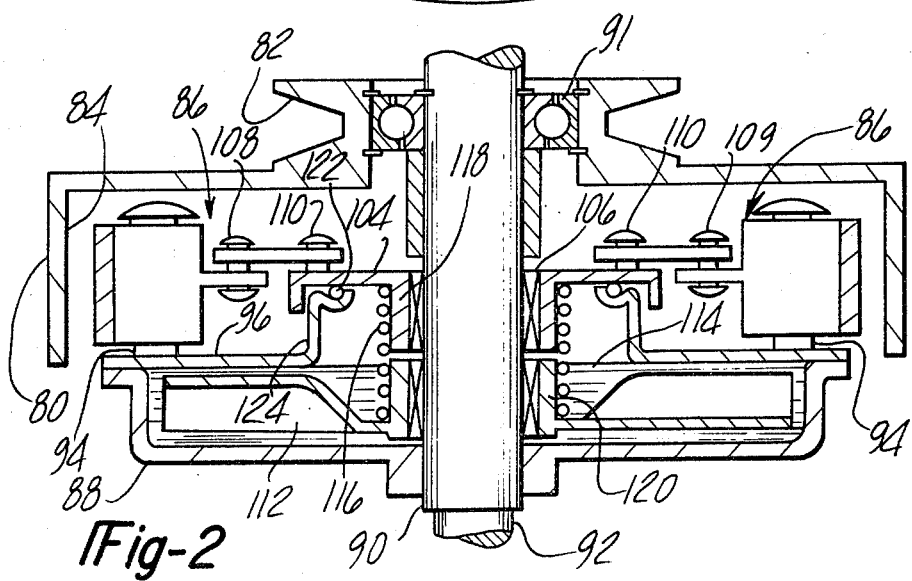
FIG. 2 is an enlarged detailed schematic sectional view of the delayed action clutch incorporated in the washing machine depicted in FIG. 1.

Referring to FIGS. 2 and 3, the centrifugal clutch 20 is depicted in detail, and includes the first and second rotatable drive members, between which drive is controllably established by action of the clutching means. The first drive member comprises a clutch drum 80 formed integrally with a sheave 82 which is adapted to drive belt 22 and which in turn drives the input to transmission 21.

Clutch drum 80 is formed with an inner surface 84 which is adapted to be frictionally engaged by one or more clutch engagement members consisting of pivotally mounted clutch shoes 86. The clutch shoes 86 are mounted to the second drive member consisting of the cup-shaped housing 88, which is connected with the shaft extension 90, driven by output shaft 92 of the drive motor 18. Shaft extension 90 extends through the centrifugal clutch 20 and drives the double pump assemblies 30 via flexible coupling 32.

Clutch drum 80 is rotatably mounted on shaft extension 90 by anti-friction bearings 91.

Clutch shoes 86 are each pivotally mounted at 94 to a cover 96 extending across the open end of the cup-shaped housing 88 such that the clutch shoes 86 are rotated by the shaft extension 90.

Clutch shoes 86 are caused to be moved about their pivots 94 by centrifugal force generated by the outboard weight of the clutch shoes 86 upon energization of the drive motor 18, in order to produce movement of the clutch shoe facings 98 into frictional driving engagement with inner surface 84 formed on the clutch drum 80.

Return springs 100 are provided which are connected at one end to the clutch shoes 86 and at the other end to a pair of connecting links 102 forming a part of the clutch delay means to be described hereinafter. Return springs 100 resist the outer movement of the clutch shoes 86 in response to the centrifugal forces and, upon cessation of rotation of the shaft extension 90, clutch shoes 86 are thereby drawn out of engagement with the inner surface 84.

As noted, the centrifugal clutch 20 includes delay means which retards movement of the clutch shoes 86 by exerting viscous damping forces thereon, such that the movement of the clutch is delayed, but which does not result in a reduction in the clutch engagement forces after the clutch shoes have moved into driving engagement.

This delay means includes rotary damper plate 104 which is rotatably mounted on the shaft extension 90 by means of a bearing 106. Rotary damper plate 104 is drivingly connected to clutch shoes 86 in such a way that the movement of the clutch shoes 86 is in a direction tending to move into frictional engagement with the clutch drum 80 and produces a rotation of the rotary damper plate 104. This means includes the connecting links 102 which are pinned at 108 to the clutch shoes 86 at one end, and at the other end are pivotally mounted at 110 to the rotary damper plate 104 at points thereof in radially opposite locations.

Movement of the clutch shoes 86 about their pivotal mounting 94 thus produces a corresponding rotation of the rotary damper plate 104.

This rotation in turn is resisted by damping means exerting viscous damping forces by the rotary damper plate 104. This viscous damping means includes a wave washer 112 disposed within cup-shaped housing 88 and a volume of a viscous liquid, such as a silicone liquid indicated at 114, such that rotation of the wave washer 112 is resisted by viscous forces. One skilled in the art will appreciate that wave washer 112 could be any irregularly contoured or perforated member which creates a damping force when rotated in the presence of the viscous liquid.

In order to retain the silicone liquid in the cup-shaped housing 88, a seal is provided at 122 disposed between the undersurface of the rotary damper plate 104 and section 124 formed integrally with the cover 96. This thus allows a rotation of the rotary damper plate 104 relative to cover 96, but insures that the silicone liquid 114 will not escape during handling of the unit in servicing.

A driving connection between the rotary damper plate 104 and the wave washer 112 is provided by one-way clutching means consisting of clutch spring 116, which extends about a hub portion 118 formed integrally with the rotary damper plate 104 and a corresponding hub portion 120 formed integrally with wave washer 112. The hub portions are axially aligned and extend into juxtaposition to each other such that clutch spring 116 can encircle both without extending across a significant gap therebetween.

The direction of wind of the clutch spring 116 is such that drive is transmitted from the rotary damper plate 104 to the wave washer 112 upon rotation in a direction corresponding to movement of the clutch shoes 86 into engagement with centrifugal clutch 20, while the clutch spring 116 slips in the opposite direction, such that wave washer 112 is not driven in this direction. This allows free movement of the clutch shoes 86 in a direction producing disengagement thereof and the disengagement of clutch is not thereby impeded.

Upon initiation of drive to the drive motor 18, either to establish agitation in the wash or rinse cycles or to spin in the extract cycle, shaft extension 90 is rotated, immediately initiating the pumping action either with the recirculation pump deck 34 or the drain pump deck 28.

Cup-shaped housing or input drive member 88 also rotates with shaft extension 90 and carries with it cover 96 and clutch shoes 86. The rotation of clutch shoes 86 causes them to pivot outwardly toward clutch drum or output drive member 80. The outward pivoting movement of clutch shoes 86 acts through connecting links 102 to rotate damper plate 104 relative to housing 88. This relative rotation is delayed by the inter-action of wave washer 112 and viscous liquid 114. This delays engagement of shoes 86 with surface 84 of drum 80. Therefore operation of transmission 21 via belt 22 (which is driven by drum 80) also is delayed. There is a period of pumping action prior to either cycle. This period is timed to enable either pump up of water in the basket 14 to drive the agitator 24, or pump down to the basket 14 prior to drive to the basket for the spin/extract cycle.

It will be appreciated that this delay period is introduced without the need for modification of increased complexity in the control system, but rather by the inherent operation of the centrifugal clutch 20.

Figure 5:
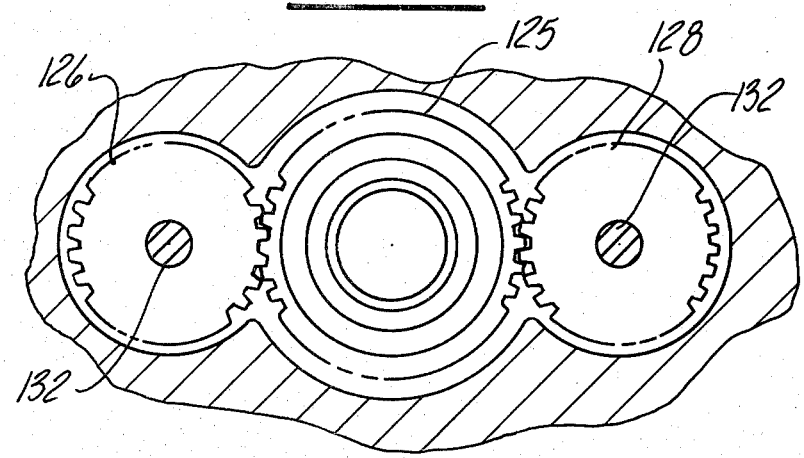
FIG. 5 is a plan view of the clutch shown in FIG. 4, in partial section.
Figure 4:
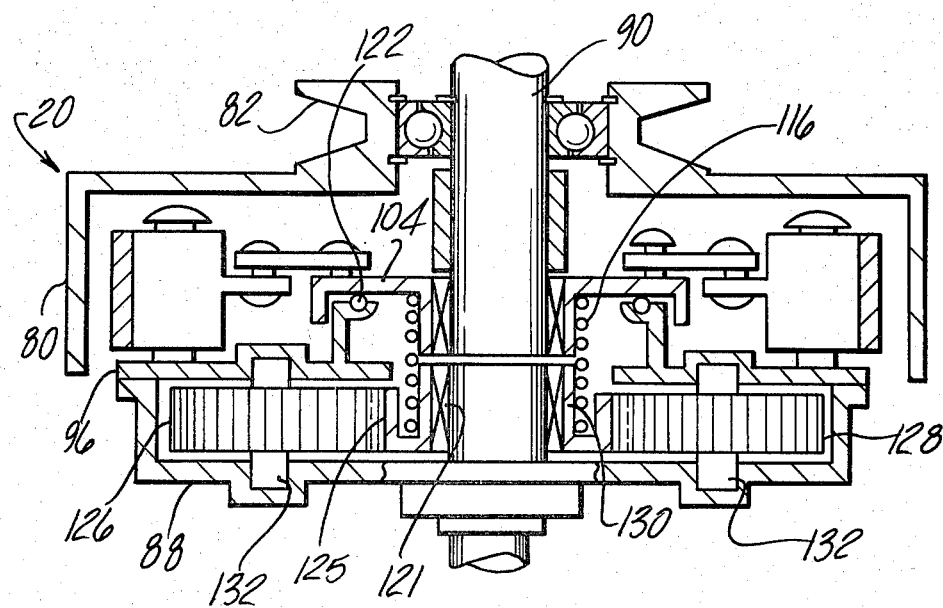
FIG. 4 is a sectional view of an alternate version of the clutch depicted in FIGS. 1 through 3.

Referring to FIGS. 4 and 5, an alternate form is depicted. In this version, the rotary damper plate 104 is drivingly connected to a pumping means consisting of a centrally located pumping gear 125 driving a pair of radial pumping gears 126 and 128.

The central pumping gear 125 is formed integrally with a gear hub 130 which is drivingly connected to the gear plate by means of the clutch spring 116 in similar fashion to the embodiment described above.

Gear hub 130 is supported on bearing 121 such as to be rotatable on shaft extension 90. Rotation of the central gear 125 causes pumping of a liquid such as oil, retained in a cup-shaped housing 88. This produces viscous damping forces resisting the rotation of the rotary damper plate 104.

The radial pumping gears 126 and 128 are rotatably supported by means of shaft 132 received in corresponding pockets formed in the cover 96 and the cup-shaped housing 88.

The pumping means could of course take many differing forms other than the gear pump version depicted.

It will be appreciated that these arrangements for producing the clutch retarding action are relatively simple in construction and highly reliable in operation. Also, since they do not involve the shifting of blocking members, they operate in a smooth fashion such that shock loadings are held to a minimum, and the noise at engagement is minimal. The resultant reduction in torque level at start in the agitation cycles or basket spin enables a less costly drive motor construction.

The embodiments of the invention in which an exclusive property or privilege is claimed are defined as follows:

1. A delayed action drive mechanism comprising:
   a first drive member;
   a second drive member;
   movable engagement means including at least one clutch member mounted to said second drive member and movable into engagement with said first drive member to establish a driving engagement therebetween;
   delay means retarding movement of said at least one clutch member into said engagement with said first drive member, said delay means including:
   a rotary member;
   means causing rotation of said rotary member by movement of said at least one clutch member towards engagement with said first drive member;
   damping means driven by said rotary member and imposing a viscous damping force thereon resisting said movement, whereby said viscous damping force delays the movement of said at least one clutch member into engagement with said first drive member, whereby engagement is delayed.

2. The drive unit according to claim 1 wherein said at least one clutch member consists of a pivotally supported clutch shoe mounted for pivoting movement into engagement with said first drive member upon outward pivoting movement thereof.

3. The drive unit according to claim 1 wherein said engagement means includes a pair of clutch shoes, each of said shoes having a frictional portion adapted for driving engagement with said first drive member, each of said shoes being pivotally mounted to said second drive member and effective upon outward pivotal movement to move its frictional portion into driving engagement with said first drive member.

4. The drive unit according to claim 3 wherein said rotary member comprises a rotary damper plate and wherein said means for causing rotation of said rotary damper plate in response to movement of said clutch shoes consists of a pair of connecting links, each pinned to said rotary damper plate at one end thereof and at the opposite end to a respective one of said clutch shoes, and wherein said points on said rotary damper plate whereat each of said connecting links is pinned thereto are at radially opposite points on said rotary damper plate, whereby movement of said clutch shoes about their pivotal mounting to said second drive member produces rotation of said rotary damper plate.

5. The drive unit according to claim 4 wherein said delay means retarding rotation of said damper plate includes a wave washer and means for rotating said wave washer in response to said rotation of said rotary damper plate in a direction corresponding to said engaging movement of said at least one clutch member, and further including a volume of viscous fluid in which said wave washer is disposed, whereby rotation of said wave washer produces a viscous damping force on said rotary damper plate means.

6. The drive unit according to claim 4 further including a pair of return spring means, each of said return spring means being drivingly connected to a respective one of said clutch shoes and to the one of said connecting links joining the respective other of said clutch shoes with said rotary damper plate to bias said clutch shoes out of engagement with said first drive member.

7. The drive unit according to claim 1 wherein said damping means includes a wave washer and means for rotating said wave washer in response to said rotation of said rotary member in a direction corresponding to said engaging movement of said at least one clutch member, and further including a volume of viscous fluid in which said wave washer is disposed, whereby rotation of said wave washer produces a viscous damping force on said rotary member.

8. The drive unit according to claim 7 wherein said means rotating said wave washer in response to said rotation of said rotary member includes one-way clutch means establishing a driving connection between said rotary member and said wave washer in said direction of rotation of said rotary member corresponding to said direction of movement of said at least one clutch member into driving engagement with said first drive member, said one-way clutch means allowing over-running in the other direction of rotation of said rotary member, whereby said movement of said at least one clutch member into the released position is unimpeded while movement thereof into engagement with said first drive member is retarded to produce said delayed engagement of said drive unit.

9. The drive unit according to claim 7 wherein said said second drive member includes a cup-shaped housing enclosing said wave washer and containing said volume of viscous fluid and further includes a cover connected over the open side of said cup-shaped housing and wherein said at least one clutch member is pivotally mounted to said cover.

10. The drive unit according to claim 9 wherein said rotary member includes an axially extending hub portion and wherein said wave washer includes an axially extending hub portion aligned with and positioned adjacent to said rotary damper plate hub portion and further including a one-way clutch spring wound commonly about both of said rotary member hub portion and said wave washer hub portion.

11. The drive unit according to claim 9 wherein said cover includes an axially extending hub extending into juxtaposition with said rotary member and including seal means interposed therebetween to seal against the loss of said viscous fluid from said cup-shaped housing.

12. In a clothes washing machine of the type including a tub and a perforate basket disposed within said tub, means for introducing a washing liquid into said tub and basket, an agitator mounted within said basket, recirculation pump means for pumping washing liquid into said basket during washing and rinsing cycles of operation of said washing machine to produce an increased liquid level in said basket relative to the liquid level in said tub, drain pump means for pumping liquid out of said basket and tub during centrifugal extraction cycles of operation of said machine, and drive means including a drive motor directly connected to said recirculation and drain pump means, transmission means for oscillating said agitator for washing and rinsing operation and for rotating said basket for centrifugal extraction operation and clutch means drivingly connected between said motor and said transmission; said clutch means including:

an input drive member connected for rotation by said motor;

at least one clutch member constructed and arranged to move outwardly in response to rotation of said input drive member;

an output drive member connected to said transmission and located for engagement by said at least one clutch member after a predetermined outward movement of said at least one clutch member so as to establish a driving connection therebetween;

a damping means; and a rotary damper plate associated with said damping means and connected to said at least one clutch member; said at least one clutch member causing rotation of rotary damper plate relative to said damping means in response to outward movement of said at least one clutch member and said damping means being effective to impose a viscous damping force on said rotary damper plate opposing such relative;

whereby engagement of said at least one clutch member with said output drive member is delayed to thereby delay the oscillation of said agitator and the rotation of said basket, respectively, for a predetermined period after said recirculation and drain pump means, respectively, are activated by said drive motor.

13. The clothes washing machine according to claim 12 wherein said at least one clutch member consists of a pivotally supported clutch shoe mounted for pivoting movement into engagement with said output drive member upon outward pivoting movement thereof.

14. The clothes washing machine according to claim 12 wherein said at least one clutch member includes a pair of clutch shoes, each of said shoes having a frictional portion adapted for driving engagement with said output drive member, each of said shoes being pivotally mounted to said input drive member and effective upon outward pivotal movement to move its frictional portion into driving engagement with said output drive member.

15. The clothes washing machine according to claim 14 wherein said rotary damper plate is connected to said pair of clutch shoes by a pair of connecting links, each pinned to said rotary damper plate at one end thereof and at the opposite end to a respective one of said clutch shoes, and wherein said points on said rotary damper plate whereat each of said connecting links is pinned thereto are at radially opposite points on said rotary damper plate, whereby movement of said clutch shoes about their pivotal mountings to said input drive member produces rotation of said rotary damper plate.

16. The clothes washing machine according to claim 15 wherein said damping means includes a wave washer and means for rotating said wave washer in response to rotation of said rotary damper plate in a direction corresponding to movement of said clutch shoes toward driving engagement with said output drive member, and further including a volume of viscous fluid in which said wave washer is disposed, whereby rotation of said wave washer produces a viscous damping force on said rotary damper plate.

17. The clothes washing machine according to claim 15 further including a pair of return spring means, each of said return spring means being drivingly connected to a respective one of said clutch shoes and to the one of said connecting links joining the respective other of said clutch shoes with said rotary damper plate to bias said clutch shoes out of engagement with said output drive member.

18. The clothes washing machine according to claim 12 wherein said damping means includes a wave washer and means for rotating said wave washer in response to rotation of said rotary damper plate in a direction corresponding to said engaging movement of said at least one clutch member, and further including a volume of viscous fluid in which said wave washer is disposed, whereby rotation of said wave washer produces the viscous damping force on said rotary damper plate.

19. The clothes washing machine according to claim 18 wherein said means rotating said wave washer in response to rotation of said rotary damper plate includes one-way clutch means establishing a driving connection between said rotary damper plate and said wave washer in said direction of rotation of said rotary damper plate corresponding to movement of said clutch shoes toward driving engagement with said output drive member, said one-way clutch means allowing over-running in the other direction of rotation of said rotary damper plate, whereby said movement of said clutch shoes into the released position is unimpeded while movement thereof into engagement with said output drive member is retarded to produce said delayed oscillation of said agitator and rotation of said basket, respectively.

20. The clothes washing machine according to claim 18 wherein said input drive member includes a cup-shaped housing enclosing said wave washer and containing said volume of viscous fluid and further includes a cover connected over the open side of said cup-shaped housing and wherein said at least one clutch member is pivotally mounted to said cover.

21. The clothes washing machine according to claim 20 wherein said rotary damper plate includes an axially extending hub portion and wherein said wave washer includes an axially extending hub portion aligned with and positioned adjacent to said rotary damper plate hub portion and further including a one-way clutch spring wound commonly about both of said rotary damper hub portion and said wave washer hub portion.

22. The clothes washing machine according to claim 20 wherein said cover includes an axially extending hub portion extending into juxtaposition with said rotary damper plate and including seal means interposed therebetween to seal against the loss of said viscous fluid from said cup-shaped housing.

* * * * *